United States Patent
Miyoshi

(10) Patent No.: US 7,897,687 B2
(45) Date of Patent: Mar. 1, 2011

(54) POLYAMIDE/POLYPHENYLENE ETHER RESIN COMPOSITION

(75) Inventor: Takaaki Miyoshi, Chiba (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 985 days.

(21) Appl. No.: 10/588,500

(22) PCT Filed: Mar. 29, 2005

(86) PCT No.: PCT/JP2005/005847

§ 371 (c)(1),
(2), (4) Date: Aug. 4, 2006

(87) PCT Pub. No.: WO2005/095518

PCT Pub. Date: Oct. 13, 2005

(65) Prior Publication Data

US 2007/0167570 A1    Jul. 19, 2007

(30) Foreign Application Priority Data

Mar. 31, 2004   (JP) .............................. 2004-105058

(51) Int. Cl.
*C08L 53/02* (2006.01)
*C08L 77/00* (2006.01)
*C08K 3/04* (2006.01)
*C08K 5/09* (2006.01)
*C08K 3/20* (2006.01)
*C08K 3/22* (2006.01)

(52) U.S. Cl. ..................... 525/88; 525/92 B; 525/92 D; 525/66; 524/496

(58) Field of Classification Search .................. 525/88, 525/92 B, 92 D, 66; 524/496
See application file for complete search history.

(56) References Cited

U.S. PATENT DOCUMENTS

| | | | | |
|---|---|---|---|---|
| 4,561,192 A * | 12/1985 | Meade | ..................... | 34/359 |
| 5,616,652 A * | 4/1997 | Kusano et al. | ............... | 525/315 |
| 6,776,929 B2 | 8/2004 | Hossan et al. | | |
| 2002/0149006 A1 | 10/2002 | Hossan et al. | | |
| 2003/0139518 A1* | 7/2003 | Miyoshi et al. | ............. | 524/495 |
| 2004/0157978 A1* | 8/2004 | Nakagawa et al. | ........... | 524/495 |

FOREIGN PATENT DOCUMENTS

| | | |
|---|---|---|
| CN | 1445282 | 10/2003 |
| JP | 62-151456 | 7/1987 |
| JP | 64-79258 | 3/1989 |
| JP | 2-201811 | 8/1990 |
| JP | 2001-26651 | 1/2001 |
| JP | 01/81473 | 11/2001 |
| JP | 2002-338804 | 11/2002 |
| JP | 2004-518774 | 6/2004 |
| WO | 02/094936 | 11/2002 |

OTHER PUBLICATIONS

Office Action issued in corresponding Chinese Patent Application No. 200580010017.4; mailed on May 30, 2008.

* cited by examiner

*Primary Examiner*—Jeffrey C Mullis
(74) *Attorney, Agent, or Firm*—Staas & Halsey LLP

(57) ABSTRACT

The present invention provides a thermoplastic resin composition obtained by feeding to an extruder and melt-kneading a polyamide; a polyphenylene ether; and a hydrogenated block copolymer (having a packed bulk density of from 0.15 to 0.25 g/cm$^3$) prepared by hydrogenating a block copolymer comprising at least one polymer block mainly composed of an aromatic vinyl compound and at least one polymer block mainly composed of a conjugated diene compound.

15 Claims, No Drawings

POLYAMIDE/POLYPHENYLENE ETHER RESIN COMPOSITION

This application claims the benefit of PCT International Application Number PCT/JP2005/005847 filed Mar. 29, 2005 and Japanese Application No. 2004-105058, filed Mar. 31, 2004 in Japan, the disclosures of which are incorporated herein by reference.

TECHNICAL FIELD

The present invention relates to a polyamide/polyphenylene ether resin composition whose productivity (production volume per unit time) is significantly increased, and which has excellent quality stability (has high Charpy impact strength and small variability in the Charpy impact strength within a lot), and relates to a molded article formed therefrom.

BACKGROUND ART

A technology to blend a polyamide/polyphenylene ether resin composition with a hydrogenated block copolymer prepared by hydrogenating a block copolymer comprising at least one polymer block mainly composed of an aromatic vinyl compound and at least one polymer block mainly composed of a conjugated diene compound includes, for example, those disclosed in Patent Documents 1 to 4 as described below.

The hydrogenated block copolymers suitably used in the polyamide/polyphenylene ether resin compositions are often in the form of a bulky amorphous powder which is called "crumb-shaped" among those skilled in the art. However, the block copolymers have a low bulk density, and it is often difficult to feed them in abundance into an extruder in terms of feeder capacity. Consequently, the feed rate of the hydrogenated block copolymers is restricted to within a certain limit, which in turn had to limit the productivity (production volume per unit time) of the polyamide/polyphenylene ether resin compositions.

In particular, remarkable improvement in the performance of a twin-screw extruder (the emergence of a megacompound type extruder) in recent times enables production at high-revolution and high-discharge rate, which in turn requires further increase in productivity per unit time of a resin composition. In spite of the requirement, the problem that productivity cannot be improved as expected gradually manifests itself due to the drawback of the hydrogenated block copolymer regarding the bulk density thereof as described above. In order to eliminate the problem, a technique is adopted in which the hydrogenated block copolymer is preblended with other resin components to reduce the overall bulk density for feeding the copolymer. However, the technique largely restricts the degree of freedom of the process. Thus, it is desired to significantly increase the productivity in terms of the technology for blending a polyamide/polyphenylene ether resin composition with a hydrogenated block copolymer.

Patent Document 1: Japanese Patent Laid-Open No. 62-151456

Patent Document 2: Japanese Patent Laid-Open No. 64-79258

Patent Document 3: International Publication WO 2002/94936

Patent Document 4: National Publication of International Patent Application No. 2004-518774

DISCLOSURE OF THE INVENTION

Problems to be Solved by the Invention

It is an object of the present invention to provide a polyamide/polyphenylene ether resin composition whose productivity can be significantly increased, and in addition whose variability in the impact strength can be stabilized at a very small variability.

Means for Solving the Problems

As a result of intensive study of the above-described problems, the present inventors have found that the above-described problems can be solved by using a hydrogenated block copolymer having specific powder properties. The present invention has been achieved on the basis of these findings.

That is, the present invention has the following structure:

[1]. A thermoplastic resin composition obtained by feeding to an extruder and melt-kneading a polyamide; a polyphenylene ether; and a hydrogenated block copolymer prepared by hydrogenating a block copolymer comprising at least one polymer block mainly composed of an aromatic vinyl compound and at least one polymer block mainly composed of a conjugated diene compound, wherein the above-described hydrogenated block copolymer to be fed to the extruder has a packed bulk density of from 0.15 to 0.25 g/cm$^3$.

[2]. The thermoplastic resin composition according to [1], wherein the above-described hydrogenated block copolymer to be fed to the extruder has a compressibility represented by the formula:

$$C=(1-A/P)\times 100$$

wherein C denotes compressibility [%]; P denotes packed bulk density [g/cm$^3$]; and A denotes aerated bulk density [g/cm$^3$], ranging from 5 to 25%.

[3]. The thermoplastic resin composition according to [2], wherein the above-described hydrogenated block copolymer to be fed to the extruder has a compressibility of from 5 to 18%.

[4]. The thermoplastic resin composition according to [1], wherein the above-described hydrogenated block copolymer to be fed to the extruder has a packed bulk density of from 0.20 to 0.25 g/cm$^3$.

[5]. The thermoplastic resin composition according to [1], wherein the above-described hydrogenated block copolymer has a number average molecular weight of from 200,000 up to 300,000.

[6]. The thermoplastic resin composition according to [1], wherein the above-described hydrogenated block copolymer is a block copolymer having a block structure of a polystyrene block-a polyethylenebutylene block-a polystyrene block.

[7]. The thermoplastic resin composition according to [1], further comprising a compatibilizer for a polyamide and a polyphenylene ether.

[8]. The thermoplastic resin composition according to [7], wherein the compatibilizer is one or more selected from the group consisting of maleic acid, fumaric acid, citric acid and anhydrides thereof.

[9]. The thermoplastic resin composition according to [1], further comprising an electroconductive carbon filler.

[10]. The thermoplastic resin composition according to [9], wherein the electroconductive carbon filler is one or more selected from the group consisting of electroconductive carbon black, carbon nanotube, carbon fibril and carbon fiber.

[11]. The thermoplastic resin composition according to [9], wherein the electroconductive carbon filler is one or more selected from the group consisting of electroconductive carbon black, carbon nanotube and carbon fibril.

[12]. The thermoplastic resin composition according to [9], wherein the electroconductive carbon filler is added in the form of a polyamide masterbatch in which the electroconductive carbon filler is contained in the polyamide in advance.

[13]. The thermoplastic resin composition according to [12], wherein the amount of the electroconductive carbon filler in the polyamide masterbatch is from 5 to 25% by mass on the basis of the mass of the polyamide masterbatch.

[14]. The thermoplastic resin composition according to [12], wherein the polyamide masterbatch is a masterbatch obtained by melting all or part of the polyamide, and then adding the electroconductive carbon filler and melt-kneading the resulting mixture.

[15]. A method for producing a thermoplastic resin composition comprising feeding to a biaxial extruder and melt-kneading a polyamide; a polyphenylene ether; and a hydrogenated block copolymer prepared by hydrogenating a block copolymer comprising at least one polymer block mainly composed of an aromatic vinyl compound and at least one polymer block mainly composed of a conjugated diene compound, wherein the resin discharge rate per the third power of the screw diameter represented by the formula:

$$R=Q/D^3$$

wherein D denotes the screw diameter [cm]; Q denotes the resin discharge rate of the extruder [kg/hr]; and R denotes the resin discharge rate per the third power of the screw diameter [kg/cm$^3$·hr], is in the range of from 1.7 to 5.0.

[16]. The method according to [15], wherein the above-described hydrogenated block copolymer to be fed to the extruder has a packed bulk density of from 0.15 to 0.25 g/cm$^3$.

[17]. The method according to [15], wherein the above-described hydrogenated block copolymer is fed to the extruder by using a feeder different from that used for feeding the polyphenylene ether and the polyamide.

[18]. The method according to [15], wherein the above-described hydrogenated block copolymer to be fed to the extruder has a compressibility of from 5 to 18%.

[19]. An injection molded article formed from the thermoplastic resin composition according to [1].

[20]. Exterior automobile parts formed from the thermoplastic resin composition according to [1].

ADVANTAGES OF THE INVENTION

The present invention can significantly increase the productivity (production volume per unit time) in blending a hydrogenated block copolymer to a polyamide/polyphenylene ether resin composition and in addition can significantly improve the quality stability (small variability in impact resistance within the same lot) of the resin composition.

BEST MODE FOR CARRYING OUT THE INVENTION

Next, each component which can be used in the present invention will be described in detail.

A type of polyamide which can be used in the present invention may be any one which has an amide bond {—NH—C(═O)—} in the main chain repeating unit of the polymer.

Generally, a polyamide can be obtained by a ring opening polymerization of lactams, a condensation polymerization of a diamine and a dicarboxylic acid, a condensation polymerization of an aminocarboxylic acid and the like, but is not limited thereto.

The above-described diamine includes an aliphatic, an alicyclic, and an aromatic diamine, and specifically includes tetramethylene diamine, hexamethylene diamine, undecamethylene diamine, dodecamethylene diamine, tridecamethylene diamine, 2,2,4-trimethylhexamethylene diamine, 2,4,4-trimethylhexamethylene diamine, 5-methylnanomethylene diamine, 1,3-bisaminomethyl cyclohexane, 1,4-bisaminomethyl cyclohexane, m-phenylene diamine, p-phenylene diamine, m-xylylene diamine, and p-xylylene diamine.

The dicarboxylic acid includes an aliphatic, an alicyclic, and an aromatic dicarboxylic acid, and specifically includes adipic acid, suberic acid, azelaic acid, sebacic acid, dodecanoic diacid, 1,1,3-tridecanoic diacid, 1,3-cyclohexane dicarboxylic acid, terephthalic acid, isophthalic acid, naphthalene dicarboxylic acid, dimmer acid and the like.

The lactams specifically include 6-caprolactam, enanthlactam, ω-laurocaprolactam and the like.

Further, the aminocarboxylic acid specifically includes 6-aminocaproic acid, 7-aminoheptanoic acid, 8-aminooctanoic acid, 9-aminononanoic acid, 11-aminoundecanoic acid, 12-aminododecanoic acid, 13-aminotridecanoic acid and the like.

In the present invention, any of copolymer polyamides can be used, which is obtained by carrying out condensation polymerization singly of or in the form of a mixture of at least two sorts of the above lactams, diamines, dicarboxylic acids and ω-aminocarboxylic acids. Moreover, polyamides obtained by polymerizing the above lactams, diamines, dicarboxylic acids and ω-aminocarboxylic acids in a reactor for the polymerization to a stage of an oligomer having a low molecular weight, and further polymerizing to a stage thereof having a high molecular weight in an extruder or the like, can suitably be used.

The method for polymerizing the polyamide resins used in the present invention is not particularly limited, and may include melt polymerization, interfacial polymerization, solution polymerization, bulk polymerization, solid phase polymerization and combinations thereof. Among these, melt polymerization is more preferably used.

The polyamide resin especially usefully employed in the present invention includes a polyamide 6, a polyamide 6,6, a polyamide 4,6, a polyamide 11, a polyamide 12, a polyamide 6,10, a polyamide 6,12, a polyamide 6/6,6, a polyamide 6/6, 12, a polyamide MXD (m-xylylene diamine),6, a polyamide 6,T, a polyamide 6,I, a polyamide 6/6,T, a polyamide 6/6,I, a polyamide 6,6/6,T, a polyamide 6,6/6,I, a polyamide 6/6,T/ 6,I, a polyamide 6,6/6,T/6,I, a polyamide 6/12/6,T, a polyamide 6,6/12/6,T, a polyamide 6/12/6,I, a polyamide 6,6/12/6,I and the like. Polyamides obtained by copolymerizing plural polyamides in an extruder or the like can also be used. A preferred polyamide is a polyamide 6, a polyamide 6,6, a polyamide 6/6,6, or a mixture thereof. A most preferred one is a polyamide 6, a polyamide 6,6, or a mixture thereof.

The polyamides which can be used in the present invention preferably have a viscosity number as measured in 96% sulfuric acid according to ISO 307 in the range of from 90 to 130 ml/g, more preferably in the range of from 100 to 125 ml/g. In the present invention, polyamides may be a mixture of plural types of polyamides having different viscosity. Examples of the mixture include a mixture of a polyamide having a viscosity number of 150 ml/g and a polyamide having a viscosity number of 80 ml/g, a mixture of a polyamide having a viscosity number of 120 ml/g and a polyamide having a viscosity number of 115 ml/g and the like. The viscosity number of the mixture can be determined by measuring it according to ISO 307 by dissolving the polyamides into 96% sulfuric acid in the weight ratio to be mixed.

A polyamide generally has an amino group and a carboxyl group as terminal groups thereof. A preferred equivalent ratio of amino groups/carboxyl groups is 9/1 to 1/9, more preferably 8/2 to 1/9, further preferably 6/4 to 1/9. As a method for adjusting a terminal group of these polyamide resins, a method known to a person skilled in the art may be used. For instance, the method includes a method in which one or more selected from diamine compounds, monoamine compounds, dicarboxylic acid compounds, monocarboxylic acid compounds and the like are added so that a predetermined terminal-group concentration can be obtained on polymerization of the polyamide resins.

Further, for the purpose of improving thermal resistant stability of a polyamide resin, a known metallic stabilizer as is described in Japanese Patent Laid-Open No. 1-163262 can be used without any problem in the present invention. Among these metallic stabilizers, CuI, $CuCl_2$, copper acetate, cerium stearate and the like are particularly preferred. A metal-alkyl halide typified by potassium iodide, potassium bromide and the like can also be suitably used. These may surely be used in combination. The total amount of the metallic stabilizer and/or the metal-alkyl halide to be blended is preferably from 0.001 to 1 part by mass based on 100 parts by mass of the polyamide resin.

Furthermore, besides the above-described metallic stabilizer, known organic stabilizers may be employed without any problem in the present invention. Examples of the organic stabilizers include hindered phenol type antioxidants represented by Irganox 1098, phosphorus type processing and thermal stabilizers represented by Irgafos 168, lactone type processing and thermal stabilizers represented by HP-136, sulfur type thermal resistant stabilizers, hindered amine type light stabilizers and the like. Among these organic stabilizers, hindered phenol type antioxidants, phosphorus type processing and thermal stabilizers, or combinations thereof are more preferable. The amount of these organic stabilizers to be blended is preferably from 0.001 to 1 part by mass based on 100 parts by mass of the polyamide resin.

In addition, besides the above-described additives, known additives and the like which can be added to polyamides may also be added in an amount of less than 10 parts by mass based on 100 parts by mass of the polyamides.

The polyphenylene ether which can be used in the present invention is a homopolymer and/or a copolymer composed of the structural unit represented by the following formula:

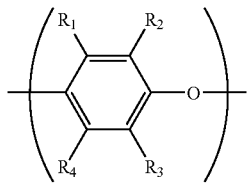

wherein O denotes an oxygen atom, and $R_1$ to $R_4$ each independently denote hydrogen, halogen, primary or secondary lower alkyl, phenyl, haloalkyl, aminoalkyl, hydrocarbonoxy, or halohydrocarbonoxy, with a proviso that at least two carbon atoms are between a halogen atom and an oxygen atom.

Specific examples of the polyphenylene ether according to the present invention include, for instance, poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether) and the like, and further include a copolymer of a polyphenylene ether such as a copolymer of 2,6-dimethylphenol with other phenols (for example, a copolymer with 2,3,6-trimethylphenol, and a copolymer with 2-methyl-6-butylphenol as described in Japanese Patent Publication No. 52-17880). When a copolymer of 2,6-dimethylphenol with 2,3,6-trimethylphenol is used as a polyphenylene ether, highly preferred is a copolymer composed of about 80 to about 90% by mass of 2,6-dimethylphenol and about 10 to about 20% mass of 2,3,6-trimethylphenol based on 100% by mass of the total polyphenylene ether as the ratio of each monomer units.

Among these, the most preferred polyphenylene ether is poly(2,6-dimethyl-1,4-phenylene ether), a copolymer of 2,6-dimethylphenol with 2,3,6-trimethylphenol, or a mixture thereof.

Any known method can be employed for producing polyphenylene ethers which can be used in the present invention. For example, methods as described in U.S. Pat. Nos. 3,306,874, 3,306,875, 3,257,357, and 3,257,358; Japanese Patent Laid-Open No. 50-51197, Japanese Patent Publication Nos. 52-17880 and 63-152628, etc. are exemplified.

Reduced viscosity ($\eta_{sp/c}$: 0.5 g/dl, in a solution of chloroform, measured at 30° C.) of the polyphenylene ether which can be used in the present invention is preferably in the range of 0.15 to 0.70 dl/g, more preferably in the range of 0.20 to 0.60 dl/g, most preferably in the range of 0.40 to 0.55 dl/g.

In the present invention, a blend of at least two sorts of polyphenylene ethers having different reduced viscosities may be used. For example, it includes a mixture of a polyphenylene ether having a reduced viscosity of not higher than 0.45 dl/g and a polyphenylene ether having a reduced viscosity of not lower than 0.50 dl/g, a mixture of a low molecular weight polyphenylene ether having a reduced viscosity of not higher than 0.40 dl/g and a polyphenylene ether having a reduced viscosity of not lower than 0.50 dl/g and the like, but of course, it is not limited thereto.

Further, the polyphenylene ether which can be used in the present invention may be a wholly or a partly modified polyphenylene ether.

As used herein the term "modified-polyphenylene ether" refers to a polyphenylene ether which has been modified with at least one modifying compound which has in the molecular structure thereof at least one carbon-carbon double bond or triple bond, and has at least one group selected from the group consisting of a carboxylic acid group, an acid anhydride group, an amino group, a hydroxyl group, and a glycidyl group.

A method for producing the modified polyphenylene ether includes (1) a method for reacting a polyphenylene ether with a modifying compound at a temperature in the range from 100° C. and lower than the glass transition temperature of the polyphenylene ether without melting the polyphenylene ether in the presence or absence of a radical initiator; (2) a method for reacting a polyphenylene ether with a modifying compound by melt-kneading at a temperature in the range of from the glass transition temperature of a polyphenylene ether up to 360° C. in the presence or absence of a radical initiator; (3) a method for reacting a polyphenylene ether with a modifying compound at a temperature of lower than the glass transition temperature of the polyphenylene ether in a solution in the presence or absence of a radical initiator; and the like. Any of these methods may be used, but methods (1) and (2) are preferred.

Next, at least one sort of modifying compound which has, in the molecular structure thereof, at least one carbon-carbon double bond or triple bond, and has at least one group selected from the group consisting of a carboxylic acid group, an acid anhydride group, an amino group, a hydroxyl group, and a glycidyl group will be specifically described below.

Examples of the modifying compound which has in the molecule thereof a carbon-carbon double bond and a carboxylic acid group or an acid anhydride group at the same time include maleic acid, fumaric acid, chloromaleic acid, cis-4-cyclohexene-1,2-dicarboxylic acid, acid anhydrides thereof and the like. Fumaric acid, maleic acid and maleic anhydride are preferred, and fumaric acid and maleic anhydride are highly preferred. Further, those compounds in which at least one or two carboxyl groups among the carboxyl groups of these unsaturated dicarboxylic acids have been esterified can also be used.

Examples of the modifying compound which has in the molecule thereof a carbon-carbon double bond and a glycidyl group at the same time include allylglycidyl ether, glycidyl acrylate, glycidyl methacrylate, an epoxidized natural oil and fat and the like. Among these glycidyl acrylate and glycidyl methacrylate are highly preferred.

Examples of the modifying compound which has in the molecule thereof a carbon-carbon double bond and a hydroxyl group at the same time include an unsaturated alcohol represented by the general formula: $C_nH_{2n-3}OH$ (wherein n is a positive integer), and an unsaturated alcohol represented by the general formula: $C_nH_{2n-5}OH$ or $C_nH_{2n-7}OH$ (wherein n is a positive integer) and the like, such as allyl alcohol, 4-pentene-1-ol and 1,4-pentadiene-3-ol.

The above-described modifying compounds may be used singly or in combination. The amount of the modifying compound to be added in producing the modified polyphenylene ether is preferably from 0.1 to 10 parts by mass, more preferably from 0.3 to 5 parts by mass, based on 100 parts by mass of the polyphenylene ether.

The preferred amount of a radical initiator in producing a modified polyphenylene ether by using the radical initiator is preferably from 0.001 to 1 part by mass, based on 100 parts by mass of the polyphenylene ether. The percentage of the modifying compound added in the modified polyphenylene ether is preferably 0.01 to 5% by mass, more preferably 0.1 to 3% by mass.

In the modified polyphenylene ether, an unreacted portion of the modifying compound and/or a polymer formed from the modifying compound may remain. The residue in this case is preferably within the range of 0.001 to 1% by mass, based on 100 parts by mass of the polyphenylene ether.

Moreover, in the present invention, a styrene-based thermoplastic resin may be blended in an amount of less than 50 parts by mass based on 100 parts by mass of the total amount of the polyamide and the polyphenylene ether.

The styrene-based thermoplastic resin according to in the present invention includes homopolystyrene, rubber-modified polystyrene (HIPS), styrene-acrylonitrile copolymers (AS resin), styrene-rubber polymer-acrylonitrile copolymers (ABS resin) and the like.

Further, various known stabilizers can suitably be employed in order to stabilize the polyphenylene ether. Examples of the stabilizers include metallic stabilizers such as zinc oxide and zinc sulfide, and organic stabilizers such as hindered phenol stabilizers, phosphorus stabilizers and hindered amine stabilizers. The amount of these organic stabilizers to be blended is preferably less than 5 parts by mass based on 100 parts by mass of polyphenylene ethers. In addition, known additives and the like which can be added to polyphenylene ethers may also be added in an amount of less than 10 parts by mass based on 100 parts by mass of the polyphenylene ethers.

A hydrogenated block copolymer comprising at least one polymer block mainly composed of an aromatic vinyl compound and at least one polymer block mainly composed of a conjugated diene compound which can be employed in the present invention will be described below.

In the hydrogenated block copolymer of the present invention, the term "mainly composed of" in the polymer block mainly composed of an aromatic vinyl compound means that at least 50% by mass or more of the block is composed of an aromatic vinyl compound. More preferably 70% by mass or more, further preferably 80% by mass or more, and most preferably 90% by mass or more of the block is composed of an aromatic vinyl compound. Similarly, the term "mainly composed of" in the polymer block mainly composed of a conjugated diene compound means that at least 50% by mass or more of the block is composed of a conjugated diene compound. More preferably 70% by mass or more, further preferably 80% by mass or more, and most preferably 90% by mass or more of the block is composed of a conjugated diene compound.

Even in the case of a block in which, for example, a small amount of a conjugated diene or another compound is randomly coupled to an aromatic vinyl compound block, the block is considered to be a block copolymer composed mainly of an aromatic vinyl compound if 50% by mass or more of the block is composed of an aromatic vinyl compound. This is also the same in the case of a conjugated diene compound block.

Specific examples of aromatic vinyl compounds include styrene, α-methylstyrene, vinyl toluene and the like. One or more selected from them can be used, and styrene is most preferred among these.

Specific examples of conjugated diene compounds include butadiene, isoprene, piperylene, 1,3-pentadiene and the like. One or more selected from them can be used, and butadiene, isoprene and a combination thereof are preferred among these. Most preferred is butadiene.

In the microstructure of a conjugated diene compound-block part before hydrogenation, the 1,2-vinyl content is preferably in the range of from 5 to 80%, more preferably from 10 to 50%, and most preferably from 15 to 40%.

The block copolymer used in the present invention is preferably a block copolymer in which a polymer block (a) mainly composed of an aromatic vinyl compound and a polymer block (b) mainly composed of a conjugated diene compound have a block sequence selected from an a-b type, an a-b-a type and an a-b-a-b type. The a-b-a type is more preferred among these. Of course, the block copolymer may have a mixture of these types.

Further, the block copolymer of an aromatic vinyl compound and a conjugated diene compound for use in the present invention needs to be a hydrogenated block copolymer. The hydrogenated block copolymer is obtained by subjecting the above-described block copolymer of an aromatic vinyl compound and a conjugated diene compound to hydrogenation treatment, thereby hydrogenating at least 50% or more of the aliphatic double bond in the polymer block mainly composed of a conjugated diene compound. More preferably 80% or more, most preferably 98% or more of the aliphatic double bond is hydrogenated.

Specifically, a most preferred block copolymer has a block structure of a polystyrene block-a polyethylene block-a polystyrene block.

The most important requirement in the present invention is that the hydrogenated block copolymer has a "Packed Bulk Density (P)" of from 0.15 to 0.25 g/cm$^3$. More preferably, the packed bulk density is in the range of from 0.20 to 0.25 g/cm$^3$, most preferably in the range of from 0.22 to 0.25 g/cm$^3$.

The term "packed bulk density (P)" as described in the present invention is one of the bulk densities of a powder determined by a powder tester (manufactured by Hosokawamicron Corporation), which can be measured from the weight of a block copolymer contained in a volume of 100 cm$^3$ after a predetermined vibration is applied to a container having the volume of 100 cm$^3$. The unit of the packed bulk density is g/cm$^3$. Typically, the number of the vibration (vertical motion) to be applied is 180 times, and the amplitude is in the range of 5 cm or less.

A specific procedure of the operation comprises quietly charging a hydrogenated block copolymer (in the state to be fed to an extruder) from the height of about 10 cm into a container of about 200 cm$^3$, and then measuring the weight of the block copolymer contained in a volume of 100 cm$^3$ after a predetermined vibration is applied. At this time, the weight of the block copolymer in the container which is filled to the top with the copolymer is measured. Further, in order to minimize the measurement error, the same operation should be repeated at least 5 times, and an average value of these measurements should be used for the packed bulk density. The measurement is preferably carried out in an environment at a temperature of 23° C. and a humidity of 50%.

A high "packed bulk density" as described herein means a large amount of weight per unit volume and a high filling factor. Packed bulk density of higher than 0.25 g/cm$^3$ is not preferred because a hydrogenated block copolymer is likely to produce blocking in a feeder hopper, which makes it difficult to stably feed the copolymer, leading to large variations in physical properties thereof in the same lot. On the other hand, packed bulk density of lower than 0.15 g/cm$^3$ is not preferred because the amount of a hydrogenated block copolymer in a feeder hopper influences the amount of the copolymer to be fed, similarly leading to large variations in physical properties thereof in the same lot.

Moreover, in the present invention, "aerated bulk density (A)" of a hydrogenated block copolymer is not particularly limited, but it is preferably in the range of from 0.1 to 0.25 g/cm$^3$, more preferably in the range of from 0.15 to 0.25 g/cm$^3$, and most preferably in the range of from 0.20 to 0.23 g/cm$^3$.

The term "aerated bulk density (A)" as described in the present invention is one of the bulk densities of a powder determined by a powder tester (manufactured by Hosokawamicron Corporation). Specifically, it can be measured from the weight of a hydrogenated block copolymer contained in a volume of 100 cm$^3$ when the block copolymer (in the state to be fed to an extruder) is quietly charged from the height of about 10 cm into a container of 100 cm$^3$. The unit of the aerated bulk density is g/cm$^3$. At this time, the weight of the block copolymer in the container which is filled to the top with the copolymer is measured. Further, in order to minimize the measurement error, the same operation should be repeated at least 5 times, and an average value of these measurements should be used for the aerated bulk density. Desirably, the measurement is carried out in an environment at a temperature of 23° C. and a humidity of 50%.

Low "packed bulk density" as described herein means a small amount of weight per unit volume, and a feeder requires a larger number of revolutions in order to feed the same weight. That is, the upper limit of the amount of the block copolymer to be fed becomes lower, causing the reduction of productivity.

Moreover, "compressibility (C)" calculated from "packed bulk density (P)" and "aerated bulk density (A)" of the hydrogenated block copolymer as calculated from the following formula is preferably from 5 to 25%, more preferably from 5 to 18%, further preferably from 5 to 15%, and most preferably from 8 to 12%.

$$C=(1-A/P)\times 100$$

wherein C denotes compressibility [%]; P denotes packed bulk density [g/cm$^3$]; and A denotes aerated bulk density [g/cm$^3$].

"Compressibility (C)" is an index which indicates the easiness of filling of a material. A hydrogenated block copolymer having a compressibility of higher than 25% means that there is a very high probability that the particles thereof will be entangled with each other by the ambient vibration in a feeder from which the copolymer is fed to an extruder, forming lumps which are hard to be fed.

Moreover, a hydrogenated block copolymer having an unstable form (for example, of string-like particles) has a low aerated bulk density and may exhibit a compressibility value of less than 5% (the aerated bulk density is very close to the packed bulk density). In such a case where a hydrogenated block copolymer has an unstable form, a feeder requires a larger number of revolutions in order to feed the same weight. That is, the upper limit of the amount of the block copolymer to be fed becomes lower, causing the reduction of productivity.

In other words, it is desired that a hydrogenated block copolymer having a compressibility of from 5 to 25% be used for suppressing the entanglement of the hydrogenated block copolymer in the feeder.

A hydrogenated block copolymer has various forms (powder-like, lump-like and the like) depending on the conditions how it is conveyed. It is necessary to use a sample in the state to be fed to an extruder, as the sample of the hydrogenated block copolymer for measuring the "packed bulk density (P)" and the "aerated bulk density (A)" in the present invention. That is, regardless of the presence or absence of the pretreatment operation (for example, treatment such as disentangling a lump-like hydrogenated block copolymer), the sample should be measured in the state to be fed to an extruder.

Moreover, the number average molecular weight of the hydrogenated block copolymer that can be used in the present invention is preferably from 50,000 to less than 500,000, more preferably from 150,000 to less than 300,000, and most preferably from 200,000 up to 300,000. Although a hydrogenated block copolymer having a molecular weight outside the above range may also be used, the hydrogenated block copolymer having a molecular weight in the above range is preferably used even in a small amount, in order to develop high impact resistance by the addition of a small amount of the hydrogenated block copolymer. More preferably, the amount of the hydrogenated block copolymer having a number average molecular weight in the above range is more than 50% by mass based on 100% by mass of the amount of the hydrogenated block copolymer to be used.

The term "number average molecular weight" in the present invention refers to a number average molecular weight in terms of standard polystyrene which is measured by an ultraviolet spectrometer [UV-41: manufactured by Showa Denko K.K.] using a gel permeation chromatography instrument [GPC SYSTEM 21: manufactured by Showa Denko K.K.]. The conditions for the measurement are as follows: solvent: chloroform, temperature: 40° C., column: the sample side (K-G, K-800RL, K-800R), the reference side (K-805L×2 pieces), flow rate: 10 ml/min, wavelength for measurement: 254 nm, pressure: 15-17 kg/cm². A low molecular weight component produced by the loss of activity of a catalyst during polymerization may be detected. However, in such a case, the low molecular weight component is not included in the molecular weight for the calculation thereof. Typically, a correct molecular weight distribution (weight average molecular weight/number average molecular weight) calculated is in the range of from 1.0 to 1.2.

The hydrogenated block copolymer is typically produced by a living anion polymerization process, in which a copolymer having an extremely narrow molecular weight distribution (Mw/Mn=approximately 1.0-1.2) is obtained.

Moreover, the block copolymer of an aromatic vinyl compound-a conjugated diene compound may include, as long as it is not contrary to the spirit of the present invention, any combination of those different from the copolymer in terms of block sequence, the species of the aromatic vinyl compound, the species of the conjugated diene compound, the content of the 1,2-vinyl bond or 1,4-vinyl bond, the content of the aromatic vinyl compound component, hydrogenation percentage and the like. Of course, a block copolymer other than the hydrogenated block copolymer defined in the present invention may be added without any problem.

Moreover, the block copolymer to be used in the present invention may be a wholly or a partly modified block copolymer. As used herein the term "modified block copolymer" refers to a block copolymer which has been modified with at least one modifying compound which has in the molecular structure thereof at least one carbon-carbon double bond or triple bond, and has at least one group selected from the group consisting of a carboxylic acid group, an acid anhydride group, an amino group, a hydroxyl group, and a glycidyl group.

A method for producing the modified block copolymer includes (1) a method for reacting a block copolymer with a modifying compound by melt-kneading at a temperature in the range of from the softening point of the block copolymer to 250° C. in the presence or absence of a radical initiator; (2) a method for reacting a block copolymer with a modifying compound at a temperature of the softening temperature of the block copolymer or lower in a solution in the presence or absence of a radical initiator; (3) a method for reacting a block copolymer with a modifying compound at a temperature of the softening point of the block copolymer or lower without melting the block copolymer and the modifying compound in the presence or absence of a radical initiator; and the like. Any of these methods may be used, but the method (1) is preferred, and an embodiment of the method (1) wherein it is performed in the presence of a radical initiator is most preferred.

The same modified compound as described in the modified-polyphenylene ether can be used herein as the at least one modified compound which has in the molecular structure thereof at least one carbon-carbon double bond or triple bond, and has at least one group selected from the group consisting of a carboxylic acid group, an acid anhydride group, an amino group, a hydroxyl group, and a glycidyl group.

The block copolymer of the present invention may be mixed with an oil mainly composed of paraffin in advance. Mixing of an oil mainly composed of paraffin can improve processability of a resin composition.

The composition ratio of a polyamide, a polyphenylene ether, and a hydrogenated block copolymer comprising at least one polymer block mainly composed of an aromatic vinyl compound and at least one polymer block mainly composed of a conjugated diene compound in the present invention is preferably from 40 to 70 parts by mass of a polyamide, from 10 to 50 parts by mass of a polyphenylene ether and from 5 to 20 parts by mass of the hydrogenated block copolymer based on 100 parts by mass of the total of these three components, more preferably from 45 to 60 parts by mass of a polyamide, from 25 to 45 parts by mass of a polyphenylene ether and from 5 to 15 parts by mass of the hydrogenated block copolymer, and most preferably from 45 to 55 parts by mass of a polyamide, from 35 to 45 parts by mass of a polyphenylene ether and from 8 to 13 parts by mass of the hydrogenated block copolymer.

Moreover, in the present invention, an electroconductive carbon filler may be added.

Examples of the electroconductive carbon filler which can be used in the present invention may include Ketjen black (EC and EC-600JD) available from Ketjen Black International Co., Ltd. and carbon fibrils (BN fibril) available from Hyperion Catalysis International, Incorporated. Among carbon fibrils, in particular, a carbon nanotube such as disclosed in International Publication WO 94/23433 is preferred.

A method for adding the electroconductive carbon filler is not particularly limited. A method for adding the electroconductive carbon filler in the form of a masterbatch in which it is preblended with a polyamide is preferred. In this case, the amount of the electroconductive carbon filler is preferably from 5 to 25% by mass based on 100% by mass of the polyamide masterbatch.

The masterbatch in which the electroconductive carbon filler is preblended with a polyamide include a masterbatch in which carbon black is uniformly dispersed in a polyamide in advance as disclosed in Japanese Patent Laid-Open No. 02-201811; a masterbatch in which carbon black is moderately non-uniformly dispersed in a polyamide as described in International Publication WO 2004/60980; a carbon fibril masterbatch such as a polyamide 66/carbon fibril masterbatch (trade name: Polyamide 66 with Fibril™ Nanotubes RMB4620-00: the amount of carbon fibrils 20%) available from Hyperion Catalisys International, Incorporated; or the like.

Among these masterbatches, the masterbatch in which carbon black is moderately non-uniformly dispersed in a polyamide is most preferred.

Specifically, a masterbatch is preferred in which at least part of carbon black is present as agglomerated particles having a major axis of from 20 to 100 μm in an amount of from 1 to 100 pieces when a continuous plane of 3 mm² is observed by means of an optical microscope. A masterbatch is more preferred in which agglomerated particles of carbon black having a major axis of from 20 to 100 μm are present in an amount of from 2 to 30 pieces when a continuous plane of 3 mm² is observed by means of an optical microscope.

The agglomerated particles of carbon black in the masterbatch are observed according to the procedure as described below. The masterbatch pellet is cut with a microtome equipped with a glass knife to the pellet with a mirror surface. The reflected light from the cut surface is observed and photographed with an optical microscope (PME 3: manufactured by Olympus Corporation) at a magnification of 50 times. The number of the agglomerated particles of the electroconductive carbon filler having a major axis of from 20 to 100 μm present in an area of 3 mm² is visually counted. Regarding the direction of the observation, since the shape of the strand-cut master pellet is typically cylindrical, the strand is cut into pellets with a cross section substantially vertical to the length of the strand. At least 3 cross sections are cut from separate pellets for observation. The average of the number of the agglomerates observed is used as the number of the agglomerated particles.

A preferred method for producing a polyamide masterbatch includes a method comprising using a biaxial extruder having one feed opening at the upstream side and one or more feed openings at the downstream side, feeding a polyamide from the upstream side, adding an electroconductive carbon filler from the downstream side and melt-kneading these components. A more preferred method includes a method comprising using a biaxial extruder having one feed opening at the upstream side and one or more feed openings at the downstream side, feeding a polyamide from the upstream side, adding an electroconductive carbon filler and a pelletized polyamide from the downstream side and melt-kneading these components.

The amount of an electroconductive carbon filler in the present invention is preferably from 0.5 to 4 parts by mass, more preferably from 1 to 3 parts by mass, and most preferably from 1.5 to 2.5 parts by mass, based on 100 parts by mass of the total amount of a polyamide, a polyphenylene ether, and a hydrogenated block copolymer comprising at least one polymer block mainly composed of an aromatic vinyl compound and at least one polymer block mainly composed of a conjugated diene compound.

Moreover, in the present invention, a compatibilizer for a polyamide and a polyphenylene ether may be added.

The compatibilizer which can be used in the present invention includes all of the compatibilizers described in International Publication WO 2001/81473. Among these, one or more selected from maleic acid, fumaric acid, citric acid and anhydrides thereof are preferred; maleic acid and the anhydride thereof are more preferred; and maleic anhydride is most preferred.

A method for adding a compatibilizer is not limited. A preferred method for adding a compatibilizer includes a method comprising preblending the compatibilizer with all or part of a hydrogenated block copolymer and then adding the blend.

In the present invention, additive components may be added as necessary in addition to the components as described above as long as they do not impair the effect of the present invention.

Examples of the additive components include an inorganic filler (talc, kaolin, xonotlite, wollastonite, titanium oxide, potassium titanate, carbon fiber, glass fiber and the like), a known silane coupling agent to enhance affinity between an inorganic filler and a resin, a flame retardant (a halogenated resin, a silicone-based flame retardant, magnesium hydroxide, aluminum hydroxide, an organic phosphate compound, ammonium polyphosphate, red phosphorus and the like), a fluoropolymer showing an effect of preventing dripping, a plasticizer (an oil, a low molecular weight polyolefin, a polyethylene glycol, fatty esters and the like), an assistant to flame retardants such as antimony trioxide, a coloring agent such as carbon black, an antistatic agent, various peroxides, zinc oxide, zinc sulfide, an antioxidant, an ultraviolet absorber, a light stabilizer and the like.

Specifically, the amount of these components to be added is in a range of not more than 100 parts by mass (as the total of the additive components) based on 100 parts by mass of the total amount of a polyamide and a polyphenylene ether.

A specific processing machine to obtain the resin composition of the present invention includes, for instance, a Single-Screw extruder, a biaxial extruder, a roll, a kneader, a Brabender Plastograph, a Bambury mixer and the like. Among them, a biaxial extruder is preferred, and particularly a biaxial extruder having a screw diameter of 40 mm or more and an L/D of 30 or more, which is provided with one upstream feed opening and one or more downstream feed openings, is most preferred.

A temperature set for the processing machine is not particularly limited, but a condition, where a suitable resin composition can be obtained, may be optionally selected from the range of from 240 to 360° C., preferably from 270 to 330° C.

The order of the addition of various materials to the extruder in the present invention is not particularly limited. Some examples of the order of addition to the biaxial extruder provided with one upstream feed opening and one or more downstream feed openings are illustrated below:

(1) To add a polyphenylene ether, a hydrogenated block copolymer, a polyamide, and optionally a compatibilizer and an electroconductive carbon filler from an upstream feed opening;

(2) To add a polyphenylene ether and optionally a compatibilizer and an electroconductive carbon filler from an upstream feed opening, and to add a hydrogenated block copolymer and a polyamide from a downstream feed opening;

(3) To add a polyphenylene ether and a hydrogenated block copolymer and optionally a compatibilizer and an electroconductive carbon filler from an upstream feed opening, and to add a polyamide from a downstream feed opening;

(4) To add a polyphenylene ether and optionally a compatibilizer from an upstream feed opening, and to add a hydrogenated block copolymer, a polyamide and optionally an electroconductive carbon filler from a downstream feed opening; or (5) To add a polyphenylene ether, a hydrogenated block copolymer and optionally a compatibilizer from an upstream feed opening, and to add a polyamide and optionally an electroconductive carbon filler from a downstream feed opening.

Among these, the addition in the order of (3), (4) or (5) is more desirable.

In the present invention, when various materials are kneaded by means of a biaxial extruder, it is possible to create larger effects by bringing the resin discharge rate per the third power of the screw diameter represented by the following formula to within a range of from 1.7 to 5.0.

$$R = Q/D^3$$

wherein D denotes the screw diameter [cm]; Q denotes the resin discharge rate of the extruder [kg/hr]; and R denotes the discharge rate per the third power of the screw diameter [kg/cm³·hr].

The hydrogenated block copolymer having a packed bulk density of from 0.15 to 0.25 g/cm³ prepared by hydrogenating a block copolymer comprising at least one polymer block mainly composed of an aromatic vinyl compound and at least one polymer block mainly composed of a conjugated diene compound according to the present invention is excellent in its powder properties, thereby allowing it to be fed to an extruder without blended with a polyphenylene ether or a polyamide. In order to eliminate the load of preblending before production and to improve productivity, it is desirable to feed the hydrogenated block copolymer to an extruder by means of a different feeder from that for a polyphenylene ether and a polyamide. Of course, this does not limit the addition of the hydrogenated block copolymer after it is preblended with a polyamide and/or a polyphenylene ether.

The thus obtained resin composition according to the present invention can be molded into moldings of various parts by conventionally known various methods, for example, injection molding.

These various parts can be suitably used, for example, for motorbike/automobile electrical equipment typified by materials for relay blocking; parts in the electrical or electronic fields such as materials for an IC tray, a chassis and a cabinet for various kinds of disc players and the like; OA parts or mechanical parts for various kinds of computers, accessory parts thereof and the like; exterior parts typified by a cowl for motorbikes, a bumper, a fender, a door panel, various kinds of lacing, an emblem, an outer door handle, a door mirror housing, a wheel cap, a roof rail and its stay material and a spoiler for automobiles; and interior parts typified by an instrument panel, a console box, a trim and the like for automobiles.

Hereinafter, the present invention will be described further in detail by referring to examples and comparative examples. The present invention is by no means restricted by the following examples.

(Hydrogenated Block Copolymer Used)

As a hydrogenated block copolymer comprising at least one polymer block mainly composed of an aromatic vinyl compound and at least one polymer block mainly composed of a conjugated diene compound (polystyrene-polyethylenebutylene-polystyrene block copolymer), was acquired Kraton G1651 from Kraton Polymers Japan. The number average molecular weight of this copolymer (in terms of standard polystyrene which is measured by an ultraviolet spectrometer [UV-41: manufactured by Showa Denko K.K.] using a gel permeation chromatography instrument [GPC SYSTEM 21: manufactured by Showa Denko K.K.]) was measured under the conditions of [solvent: chloroform, temperature: 40° C., column: the sample side (K-G, K-800RL, K-800R), the reference side (K-805L×2 pieces), flow rate: 10 ml/min, wavelength for measurement: 254 nm, pressure: 15-17 kg/cm$^2$]. The number average molecular weight was about 250,000. When the above data was processed, a component having a number average molecular weight of 100,000 or less produced by the loss of activity of a catalyst was observed. However, the component was not included in the calculation of the molecular weight.

When a sealed bag of the acquired G1651 (a bag containing about 18 kg) was opened, each particle was in the shape of an amorphous particle called "crumb-shaped", but as a whole the particles were in a blocking state to the extent that the shape of the bag was substantially retained. In order to loosen the G1651 in a blocking state, it was ground in a Henschel mixer [FM 20C/I: manufactured by Mitsui Mining Co., Ltd.] having a volume of 20 l. At this time, the number of revolutions was 500 rpm, and the time of revolution was 2 minutes.

The resulting ground G1651 was classified using wire gauzes having different meshes, obtaining two types of G 1651 having different powder properties (sample-A and sample-B). The obtained two types of samples (sample-A and sample-B) and G1651 before sieving were measured for powder properties (packed bulk density, aerated bulk density and compressibility) using a powder tester [manufactured by Hosokawamicron Corporation], and the results of the measurement are shown in Table 1.

It should be noticed these samples are different only in powder properties.

TABLE 1

| Hydrogenated block copolymer | PBD[a] | ABD[b] | C[c] |
|---|---|---|---|
| G1651 | 0.279 | 0.218 | 21.9 |
| Sample-A | 0.211 | 0.169 | 19.9 |
| Sample-B | 0.234 | 0.209 | 10.7 |

[a]PBD: Packed Bulk Density
[b]ABD: Aerated Bulk Density
[c]Compressibility

Examples 1 to 3

Example 1: For Comparison, Examples 2 and 3: the Present Invention

To 100 parts by mass of a maleic anhydride-modified polyphenylene ether [trade name: Xyron R4919] (hereinafter referred to simply as MPPE) manufactured by Asahi Kasei Chemicals Co., Ltd., was dry-blended 25 parts by mass of each of various hydrogenated block copolymers to compare feed capacity (compare the maximum feed rate) of a feeder. The screw speed ratio of the feeder [the percentage of the actual number of screw revolutions (indicated by percentage) when the maximum number of screw revolutions is represented by 100%] was adjusted to be 90%, and the feeder was operated for 20 minutes under the ratio. The amount that was actually fed was measured for comparison.

In addition, various hydrogenated block copolymers were each individually compared for the feed capacity in a similar manner.

The measurement results were shown in Table 2.

The feeder used for the feed test is the K2-ML-S60 type feeder (Monoaxial screw type) manufactured by K-Tron Corporation (Switzerland).

TABLE 2

| | Hydrogenated block copolymer | Feed rate$_{(blend)}$[a] | Feed rate$_{(hydrogenated\ block\ copolymer)}$[b] |
|---|---|---|---|
| Example 1 | G1651 | 21 kg/h | 5-10 kg/h[c] |
| Example 2 | Sample-A | 27 kg/h | 11 kg/h |
| Example 3 | Sample-B | 45 kg/h | 15 kg/h |

[a]Maximum feed rate of MPPE/hydrogenated block copolymer = 80/20
[b]Maximum feed rate of individual hydrogenated block copolymer
[c]Blocking occurred in the feeder hopper, causing unstable feed.

The results in Table 2 revealed that the feed rate significantly varies due to the difference of powder properties. When G1651 was fed individually, a phenomenon that it was agglomerated by its own weight at the center of the feeder hopper was observed, and there occurred a problem that a cavity was formed at the lower part of the hopper. Accordingly, in order to continue stable feed, periodical vibrations were applied to prevent the cavity.

Examples 4 to 6

Example 4: For Comparison, Examples 5 and 6: the Present Invention

Then, a monoaxial weight-type feeder manufactured by ACRISON Inc. was used to perform a feed test to feed two types of samples (sample-A and sample-B) and G1651 before sieving at a feed rate of 100 kg/hr. Ease of feed was compared by the screw speed ratio [the percentage of the actual number of screw revolutions (indicated by percentage) when the maximum number of screw revolutions is represented by 100%] in the test. In this case, the smaller the screw speed ratio, the larger feed is possible. The results are shown in Table 3.

TABLE 3

| | Hydrogenated block copolymer | Screw speed ratio |
|---|---|---|
| Example 4 | G1651 | 45%–69%[a] |
| Example 5 | Sample-A | 53%–63% |
| Example 6 | Sample-B | 42%–43% |

[a]When the volume of the sample remaining in the hopper became small, there was observed a phenomenon that the screw speed ratio was increasing.

Example 7

For Comparison

The cylinder temperature of ZSK40MC [manufactured by Coperion Corporation (Germany)] having an L/D of 44, which is provided with an upstream feed opening and an downstream feed opening, was set at 320° C. from the upstream feed opening to the down stream feed opening and at 280° C. from the downstream feed opening to a die. The downstream feed opening at this time was set at a position of about 0.55 from the upstream side when the total length of the screw was defined as 1.0. In addition, vent ports were provided at two points, that is, at a position of about 0.35 and at a position of 0.90 for vacuum suction.

A dry-blend of 40 parts by mass of MPPE and 10 parts by mass of a hydrogenated block copolymer (trade name: Kraton G1651) ground by the above-described Henschel mixer was fed from the upstream feed opening for melt-kneading. Subsequently, 50 parts by mass of Leona 1200 [hereinafter abbreviated simply as PA] available from Asahi Kasei Chemicals Co., Ltd. was fed as a polyamide from the downstream feed opening for melt-kneading. The discharge rate at the beginning was 60 kg/hr, and the number of screw revolutions was 240 rpm (the ratio of the discharge rate/the number of screw revolutions=0.25). The feed of G1651 was performed using the K2-ML-S60 type feeder (monoaxial screw type) manufactured by K-Tron Corporation (Switzerland).

In order to compare productivity, the feed rate to the extruder was gradually increased and the maximum discharge rate was measured. Since a discharge rate of 75 kg/hr was the upper limit of the feed capacity of the feeder for feeding to the upstream feed opening, this value was defined as the maximum discharge rate. At this time, the discharge rate (R) per the third power of the screw diameter was 1.17. The number of screw revolutions was 300 rpm while keeping the ratio of the discharge rate/the number of screw revolutions at 0.25.

During the time period of extrusion, samples from 10 different time points were collected (the sampling was performed every 3 minutes). Multipurpose specimens described in ISO 294-1 were molded from the pellets of each sample at a molten resin temperature of 290° C. and at a mold temperature of 90° C. by means of an injection machine (IS80EPN: manufactured by Toshiba Machine Co., Ltd.), and were left at rest in an aluminum moisture-proof bag at 23° C. for 48 hours. The obtained each specimens were cut at both edges and measured for Charpy impact strength (measured by using 10 pieces of specimens per one time point) in the edgewise direction according to ISO 179. The measurement were performed for 10 different time points, and average and standard deviation of the impact strength for the 10 points were calculated and shown in Table 4 together with the maximum and minimum values of the impact strength.

Examples 8 and 9

The Present Invention

These examples were carried out in the same manner in as Example 7 except that G1651 in Example 1 was changed to Sample-A and Sample-B, and the maximum discharge rate and Charpy impact strength were measured. The results measured are shown in Table 4.

TABLE 4

| Hydrogenated block copolymer | Maximum discharge rate kg/hr | Number of screw revolutions rpm | Charpy impact strength (kJ/m$^2$) | | | |
|---|---|---|---|---|---|---|
| | | | Average of 10 points | Standard deviation | Maximum value | Minimum value |
| Example 7 (G1651) | 75 | 300 | 27.4 | 1.74 | 30.2 | 25.6 |
| Example 8 (Sample-A) | 100 | 400 | 31.0 | 0.85 | 32.3 | 29.8 |
| Example 9 (Sample-B) | 135 | 540 | 30.5 | 0.40 | 31.1 | 29.8 |

The discharge rate (R) per the third power of the screw diameter in Examples 8 and 9 was 1.56 and 2.10, respectively. It was revealed from Table 4 that Examples 8 and 9 show better productivity (production volume per unit time) and stability in Charpy impact strength than Example 7.

Example 10

For Comparison

The extruder used in Example 4 was set at same temperature as in Example 4. To the extruder, was fed from the upstream feed opening for melt-kneading a mixture prepared by dry-blending 40 parts by mass of a polyphenylene ether powder manufactured by Asahi Kasei Chemicals Co., Ltd. (trade name: Asahi Kasei PPE S201A) [hereinafter abbreviated simply as PPE] and 0.3 parts by mass of maleic anhydride as a compatibilizer and 10 parts by mass of a hydrogenated block copolymer (trade name: Kraton G1651) ground by a Henschel mixer. At this time, the mixture of the polyphenylene ether powder and maleic anhydride was fed from a different feeder than that for G1651. Subsequently, was fed from the downstream feed opening a dry-blend of 30 parts by mass of PA and 20 parts by mass of a masterbatch prepared by previously dispersing electroconductive carbon black (Ketjen black EC-600JD: manufactured by Ketjen Black International Co., Ltd.) in PA at a concentration of 10% by mass [hereinafter referred to simply as KB-MB].

The KB-MB used at this time was prepared by means of the above-described ZSK-40MC by adding a polyamide from the upstream feed opening and Ketjen black EC600JD from the downstream feed opening for melt-kneading. The temperature set for the cylinder at this time was 280° C., and the number of screw revolutions was set at 400 revolutions/min. Each feeder was controlled so that a discharge rate of 50 kg/hr is obtained. For the obtained polyamide-carbon masterbatch, the number of agglomerated particles was confirmed by an optical microscope to be 20 pieces.

In order to compare productivity, the feed rate to the extruder was gradually increased as in Example 7, and the maximum discharge rate was measured. The variation in the feed rate of a hydrogenated block copolymer as observed in Example 1 (a variation of about 5 to 10 kg/hr) was also observed at this time. Since a discharge rate of 90 kg/hr was the upper limit of the feed capacity of the feeder (the variation in the feed rate supposedly due to the cavity generated in the feeder was close to the upper limit of the range of variation), this value was defined as the maximum discharge rate. The number of screw revolutions was 360 rpm while keeping the ratio of the discharge rate/the number of screw revolutions at 0.25 as in Example 7. At this time, the discharge rate (R) per the third power of the screw diameter was 1.41.

Moreover, an extruded strand was collected and cut to a length of 5 cm (the diameter of the strand was controlled in the range of from 0.29 to 0.3 cm by changing the speed for pulling the strand). The cut strand was coated with silver paste at the both ends thereof and dried to verify the electric conductivity between the both ends. An electric conductivity of from about 1.8 to 2.3 kΩ was observed.

The obtained pellets were subjected to Charpy impact test and used for the confirmation of variability as in Example 7. The results are shown in Table 5.

Examples 11 and 12

The Present Invention

These examples were carried out in the same manner in as Example 7 except that G1651 in Example 7 was replaced by Sample-A and Sample-B, and the maximum discharge rate and Charpy impact strength were measured. The results measured are shown in Table 5.

In Examples 11 and 12, a phenomenon of variation in the feed rate as observed in Example 10 was not confirmed, but in Example 11 the screw speed ratio significantly varied, influenced by the amount of the sample in the hopper.

Moreover, an extruded strand was collected and cut to a length of 5 cm (the diameter of the strand was controlled in the range of from 0.29 to 0.3 cm by changing the speed for pulling the strand). The cut strand was coated with silver paste at the both ends thereof and dried to verify the electric conductivity between the both ends. An electric conductivity of from about 1.6 to 2.0 kΩ was observed in both Examples 11 and 12.

The discharge rate (R) per the third power of the screw diameter in Examples 11 and 12 was 1.56 and 1.95, respectively. It was revealed that Examples 11 and 12 show better productivity (production volume per unit time) and stability in Charpy impact strength (has small variability in physical properties) than Example 10.

Example 13

The Present Invention

The cylinder temperature of ZSK70MC [manufactured by Coperion Corporation (Germany)] having an L/D of 46, which is provided with an upstream feed opening and one feed opening and an automatic screen changer block at the downstream side, was set at 320° C. from the upstream feed opening to the down stream feed opening and at 280° C. from the downstream feed opening to a die. The downstream feed opening at this time was set at a position of about 0.55 from the upstream side when the total length of the screw was defined as 1.0. In addition, vent ports were provided at two points, that is, at a position of about 0.35 and at a position of 0.90 for vacuum suction.

From the upstream feed opening, were fed for melt-kneading 40 parts by mass of PPE and a mixture prepared by preblending 10 parts by mass of Sample-B and 0.3 parts by mass of maleic anhydride as a compatibilizer. At this time, the mixture of Sample-B and maleic anhydride was fed from a feeder different from that for the polyphenylene ether powder. The feeder used was a monoaxial weight-type feeder manufactured by ACRISON Inc. Subsequently, a dry-blend of 30 parts by mass of PA and 20 parts by mass of KB-MB was fed from the downstream feed opening.

At this time, the discharge rate in terms of the polyamide/polyphenylene ether composition was adjusted to 1,000 kg/hr (the supply rate of the hydrogenated block copolymer was 100 kg/hr), and the number of screw revolutions was adjusted to 550 rpm. At this time, the discharge rate (R) per the third power of the screw diameter was 2.92. At this time, the electric conductivity of the strand was verified in the manner as described in Examples 10 to 12, and an electric conductivity of about 1.2 kΩ was observed.

A flat molded piece having a length of 90 mm, a width of 50 mm and a thickness of 2.5 mm was molded at a molten resin temperature of 290° C. and at a mold temperature of 90° C. by means of an injection machine (IS80EPN: manufactured by Toshiba Machine Co., Ltd.), and were left at rest in an aluminum moisture-proof bag at 23° C. for 48 hours. The flat molded piece was used to measure surface impact strength (according to ISO 7765-2: 1994) by means of a graphic impact tester (manufactured by Toyo Seiki Seisaku-sho, Ltd.) set at conditions of a sample holder diameter of 40 mm, a striker diameter of 12.7 mm, a load of 60 kg and a collision

TABLE 5

| Hydrogenated block copolymer | Maximum discharge rate kg/hr | Number of screw revolutions rpm | Charpy impact strength (kJ/m$^2$) | | | |
|---|---|---|---|---|---|---|
| | | | Average of 10 points | Standard deviation | Maximum value | Minimum value |
| Example 10 (G1651) | 90 | 360 | 27.4 | 1.74 | 30.2 | 25.6 |
| Example 11 (Sample-A) | 100 | 400 | 31.0 | 0.85 | 32.3 | 29.8 |
| Example 12 (Sample-B) | 125 | 500 | 30.5 | 0.40 | 31.1 | 29.8 | speed of the striker to the sample of 5 m/sec. The surface impact strength as described in the present invention is represented by the sum (total absorption energy) of the energy when cracks are generated in the flat sheet (crack generation energy) and the energy when the cracks are propagated (propagation energy). At this time, 5 pieces of test specimens were used for evaluation. The average value and standard deviation of the surface impact strength for the 5 pieces of test specimens were calculated and shown in Table 6 together with the maximum and minimum values of the surface impact strength.

Example 14

The Present Invention

This example was carried out in the same manner as in Example 13 except that the discharge rate in terms of the polyamide/polyphenylene ether composition was adjusted to 500 kg/hr (the supply rate of the hydrogenated block copolymer was 50 kg/hr) to evaluate physical properties. The electric conductivity of the strand at this time was verified, and an electric conductivity of about 2.0 kΩ was observed. The obtained results are shown in Table 6.

TABLE 6

| Hydrogenated block copolymer | Maximum discharge rate kg/hr | Surface impact strength (J) | | | |
|---|---|---|---|---|---|
| | | Average of 5 pieces | Standard deviation | Maximum value | Minimum value |
| Example 13 (Sample-B) | 1000 | 31.0 | 3.03 | 35.5 | 27.5 |
| Example 14 (Sample-B) | 500 | 28.6 | 7.70 | 35.3 | 15.6 |

In Example 14, similar results to those in Example 13 were obtained except that only one test piece showed a surface impact strength of 15.6 J (minimum value).

Example 15

For Comparison

This example was carried out in the same manner as in Example 10 except that the component to be added from the downstream feed opening was replaced by a dry-blend of 42 parts by mass of PA and 8 parts by mass of a carbon fibril masterbatch (CF-MB) which is a polyamide 66/carbon fibril masterbatch (trade name: Polyamide 66 with Fibril™ Nanotubes RMB4620-00: the amount of carbon fibril is 20%), and the maximum discharge rate and Charpy impact strength were measured. The results are shown in Table 7.

Moreover, at this time, an extruded strand was collected and cut to a length of 5 cm (the diameter of the strand was controlled in the range of from 0.29 to 0.3 cm by changing the speed for pulling the strand). The cut strand was coated with silver paste at the both ends thereof and dried to verify the electric conductivity between the both ends. An electric conductivity of from about 0.9 to 1.5 kΩ was observed.

The variation in the feed rate of a hydrogenated block copolymer as observed in Example 10 (a variation of about 5 to 10 kg/hr) was also observed in the present example.

Example 16

The Present Invention

This example was carried out in the same manner as in Example 12 except that the component to be added from the downstream feed opening was replaced by a dry-blend of 42 parts by mass of PA and 8 parts by mass of a carbon fibril masterbatch (CF-MB) which is a polyamide 66/carbon fibril masterbatch (trade name: Polyamide 66 with Fibril™ Nanotubes RMB4620-00: the amount of carbon fibril is 20%), and the maximum discharge rate and Charpy impact strength were measured. The results are shown in Table 7.

Moreover, at this time, an extruded strand was collected and cut to a length of 5 cm (the diameter of the strand was controlled in the range of from 0.29 to 0.3 cm by changing the speed for pulling the strand). The cut strand was coated with silver paste at the both ends thereof and dried to verify the electric conductivity between the both ends. An electric conductivity of from about 0.7 to 1.0 kΩ was observed.

TABLE 7

| Hydrogenated block copolymer | Maximum discharge rate kg/hr | Number of screw revolutions rpm | Charpy impact strength (kJ/m²) | | | |
| --- | --- | --- | --- | --- | --- | --- |
| | | | Average of 10 points | Standard deviation | Maximum value | Minimum value |
| Example 15 (G1651) | 90 | 360 | 23.0 | 3.70 | 26 | 15.3 |
| Example 16 (Sample-B) | 125 | 500 | 24.2 | 0.64 | 25.3 | 23.5 |

INDUSTRIAL APPLICABILITY

The present invention can provide a resin composition whose productivity (production volume per unit time) is significantly increased, and which has superior quality stability (has small variability in impact properties within a lot), as compared to conventional technology. The resin composition of the present invention can be widely applied in various industrial fields in the form of injection molded articles such as automobile exterior parts.

The invention claimed is:

1. A method for producing a thermoplastic resin composition, comprising:
    feeding to an extruder and melt-kneading a polyamide, a polyphenylene ether, and a hydrogenated block copolymer prepared by hydrogenating a block copolymer comprising at least one polymer block mainly composed of an aromatic vinyl compound and at least one polymer block mainly composed of a conjugated diene compound,
    wherein said hydrogenated block copolymer fed to the extruder has a packed bulk density of 0.15~0.25 g/cm³.

2. The method for producing a thermoplastic resin composition according to claim 1, wherein said hydrogenated block copolymer fed to the extruder has a compressibility represented by the formula: $C=(1-A/P)\times 100$ wherein C denotes compressibility [%]; P denotes packed bulk density [g/cm³]; and A denotes aerated bulk density [g/cm³], ranging from 5 to 25%.

3. The method for producing a thermoplastic resin composition according to claim 2, wherein said hydrogenated block copolymer fed to the extruder has a compressibility of from 5 to 18%.

4. The method for producing a thermoplastic resin composition according to claim 1, wherein said hydrogenated block copolymer fed to the extruder has a packed bulk density of from 0.20 to 0.25 g/cm³.

5. The method for producing a thermoplastic resin composition according to claim 1, wherein said hydrogenated block copolymer has a number average molecular weight of from 200,000 up to 300,000.

6. The method for producing a thermoplastic resin composition according to claim 1, wherein said hydrogenated block copolymer is a block copolymer having a block structure of a polystyrene block-a polyethylenebutylene block-a polystyrene block.

7. The method for producing a thermoplastic resin composition according to claim 1, further comprising a compatibilizer for a polyamide and a polyphenylene ether.

8. The method for producing a thermoplastic resin composition according to claim 7, wherein the compatibilizer is one or more selected from the group consisting of maleic acid, fumaric acid, citric acid and anhydrides thereof.

9. The method for producing a thermoplastic resin composition according to claim 1, further comprising an electroconductive carbon filler.

10. The method for producing a thermoplastic resin composition according to claim 9, wherein the electroconductive carbon filler is one or more selected from the group consisting of electroconductive carbon black, carbon nanotube, carbon fibril and carbon fiber.

11. The method for producing a thermoplastic resin composition according to claim 9, wherein the electroconductive carbon filler is one or more selected from the group consisting of electroconductive carbon black, carbon nanotube and carbon fibril.

12. The method for producing a thermoplastic resin composition according to claim 9, wherein the electroconductive carbon filler is added in the form of a polyamide masterbatch in which the electroconductive carbon filler is contained in the polyamide in advance.

13. The method for producing a thermoplastic resin composition according to claim 12, wherein the amount of the electroconductive carbon filler in the polyamide masterbatch is from 5 to 25% by mass on the basis of the mass of the polyamide masterbatch.

14. The method for producing a thermoplastic resin composition according to claim 12, wherein the polyamide masterbatch is a masterbatch obtained by melting all or part of the polyamide, and then adding the electroconductive carbon filler and melt-kneading the resulting mixture.

15. The method according to claim 1, wherein said hydrogenated block copolymer is fed to the extruder by using a feeder different from that used for feeding the polyphenylene ether and the polyamide.

* * * * *